July 25, 1944.  D. R. HILLIS  2,354,460

HYDRAULIC TUBE COUPLING

Filed Dec. 16, 1940

INVENTOR.
David R. Hillis
BY
ATTORNEY.

Patented July 25, 1944

2,354,460

UNITED STATES PATENT OFFICE 2,354,460

HYDRAULIC TUBE COUPLING

David R. Hillis, Detroit, Mich., assignor, by mesne assignments, to Logansport Machine, Incorporated, a corporation of Indiana Application December 16, 1940, Serial No. 370,265

7 Claims. (Cl. 285—86)

My invention relates to new and useful improvements in tube couplings and more particularly to a tube coupling for clamping the flared end of a tube.

An object of the invention is to provide an improved tube or pipe coupling with special novel means that will resist the forces and vibrations that strongly tend to loosen the connections, especially in steel tubes used in hydraulic apparatus, and that will compensate for variations in size and irregularities in the tubes.

A further object of the invention is to provide such a coupling in which the female member or nut, comprising an outer and an inner sleeve, occupies a relatively short space, the bore of the outer sleeve being considerably larger than the diameter of the tube to be coupled, allowing it to pass over or to go around a sharp bend in the tube, making it easy to couple or uncouple tubes in close quarters.

Another object of the invention is to provide a tube coupling comprising, a male member having a projecting face on its inner projecting portion, and a female member consisting of an inner and an outer sleeve, the latter having threaded engagement with the male member, the inner sleeve having a flared inner end presenting an inclined face adapted to cooperate with the inclined face on the projecting portion of the male member in clamping the flared end of a tube therebetween, the outer sleeve having an inclined face adapted to press against the flared end of the tube, both of said sleeves having cooperating tapering surfaces for gradually forcing the inner sleeve toward the male member as the parts are screwed together, whereby to clamp the flared end of the tube between the inclined faces of said male member and said inner sleeve and to simultaneously press the inner sleeve tightly against the tube, the entire structure thus forming a double-acting clamping lock, said tapering surfaces comprising a slow taper on the outer surface of the outer end portion of the inner sleeve and a corresponding taper on the inside surface of the outer end portion of the outer sleeve.

The main advantage of this double clamping structure lies in the fact that, as the two clamping portions are spaced apart a considerable distance, a large bearing surface is provided on the inner sleeve. Since the tube is thus clamped at a distance from its flared end, vibrations caused by hydraulic shock are not transferred from the tube proper to its flared end. Hence the flared end of the tube does not get torn away as would otherwise be the case.

Another object of the invention is to provide a tube coupling wherein the tubes may be slightly out of alignment before the coupling parts are tightly screwed together, the tightening operation forcing the tubes into alignment.

Further objects and advantages are within the scope of my invention, such as relate to the arrangement, operation and function of the related elements of the structure, to various details of construction, to economies of manufacture and numerous other features, as will be apparent from a consideration of the specification in conjunction with the drawing disclosing specific embodiments of my invention, in which.

Figure 1:
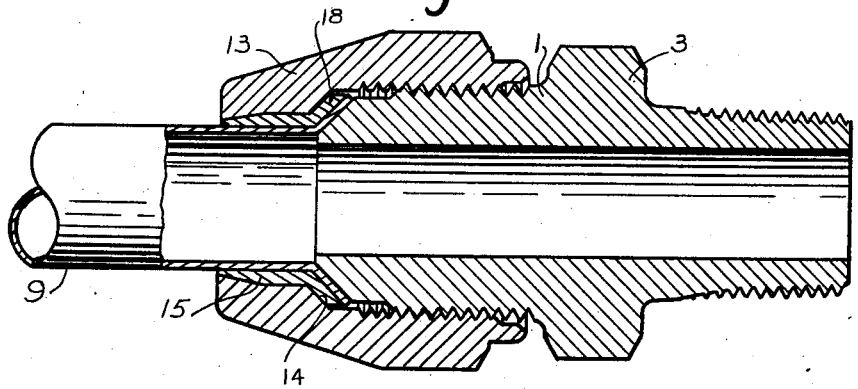
Fig. 1 is a sectional view through a tube coupling embodying the improvements and showing the members as clamping the flared end of a tube, the tapered portions of the female member squeezed and gripping the tube securely.
Figure 2:
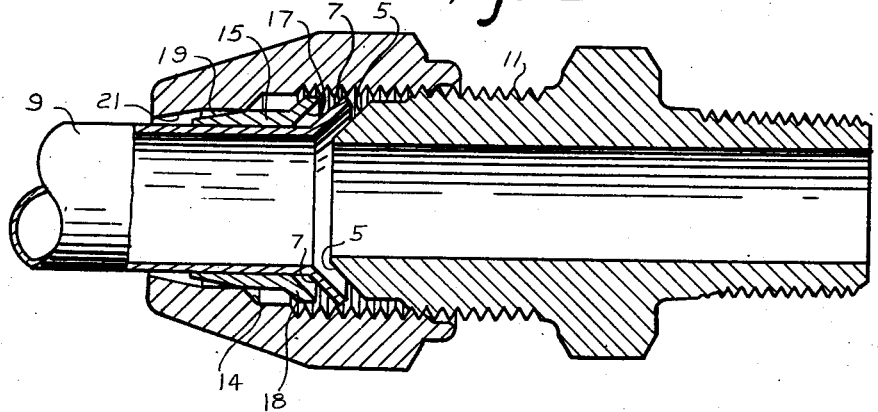
Fig. 2 is a similar view showing the members in position where they are about to contact with the flared end of a tube, before the parts are turned so as to bring about a double clamping action on the tube.
Figure 3:
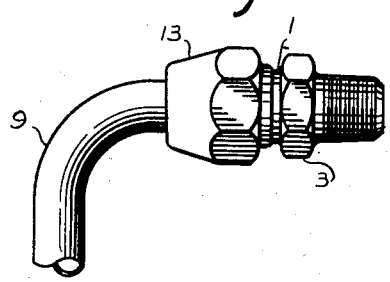
Fig. 3 is a view on a reduced scale, showing the exterior of a coupling embodying my invention attached to the end of a bent tube.

Referring more particularly to Figs. 1, 2 and 3 of the drawing, my improved pipe coupling comprises a male member 1 of a generally tubular conformation having a laterally extending portion 3 suitably conformed for receiving a wrench in a well known manner. The inwardly projecting end of the male member has a conical surface 5 providing a smooth uniform tapered seat for extending into the flared end 7 of a tube 9 which is to be clamped thereon. For this purpose a tapered seat 5 inclined at an angle of forty-five degrees to the longitudinal axis of the coupling is very satisfactory. External threads 11 are provided on the outside of the projecting end of the male member for threadably receiving the outer sleeve 13 of the female member.

The outer sleeve 13 of the female member is provided with an inclined face 14 of substantially the same angle as that of the inclined face 5 on the male member for a purpose hereinafter to be described. The inner sleeve, before being clamped in position, is slidable in the outer sleeve. It has a tapering seat surface 17 in its flared end 18, disposed at substantially the same angle as the tapered seat surface 5 on the end of the male member 1. These two inclined surfaces 5 and 17 are adapted to engage the outer surface of the flared end 7 of a tube 9 to be clamped therebetween and the two surfaces 5 and 14 therefore clamp the flared ends of the tube and of the inner sleeve therebetween when the parts are tightly screwed together. The other end of the inner sleeve 15 terminates in the outer sleeve 13 at a short distance from the end of the male member and is provided with a slow taper 19 thereon to cooperate with a slowly constricting surface 21 which is provided in the same end of the outer sleeve. Because of the considerable constricting or wedging action thus provided for, the diameter of the various tubes 9 which are to be coupled may be vary from $8/1000$ to $10/1000$, being that much smaller than the inner diameter of the inner sleeve 15 without deviating from the effective clamping action on the main body of the tube. Such an allowance is considered sufficient for normal variations found in such tubes as may be purchased on the market.

In use, the tube 9 to be connected is passed through the inner sleeve 15 in the female member and the inserted end of the tube is flared in a usual manner. The outer sleeve 13 of the female member is then screwed upon the male member 1 with the flared end 7 of the tube fitting onto the smooth tapered or conical surface thereof. As the outer sleeve 13 is screwed onto the male member the slowly tapered surfaces 21 in the opposite end thereof engage on the adjacent tapered surfaces 19 of the inner sleeve, forcing the inner sleeve toward the male member. Eventually the inclined surface 14 in the outer sleeve engages the flared end 18 of the inner sleeve and its inclined surface 17 engages the flared end 7 of the tube, thus firmly clamping the latter between the surfaces 5 and 17. At the same time the inner sleeve is pressed tightly around the tube, for holding it firmly and resisting the tendency of the tube to be vibrated by the machinery with which it may be connected or by the impact of hydraulic pressure caused by valve action in a hydraulic system. The pipe coupling thus forms a double-acting wedgelike lock in which one end of the inner sleeve 15 clamps the flared end of the tube and the other end of the sleeve grips around the outside of the tube.

The holding of the tube 9 resulting from the constricting surfaces 19 and 21 serves two worthy purposes. First, it holds the outer female member 13 from becoming unscrewed from the male member 1; second, it stops vibration of the tube and thus prevents the tube from breaking at its flared end 7.

It should be self-evident that my tube couplings permit two tubes to be coupled even though they are slightly out of alignment; as it may be seen in Fig. 2, that pipe 9 can be oscillated slightly until the parts are firmly screwed together, which latter operation draws the tubes into alignment.

Because of the construction of my improved pipe fitting, it also has the further advantage of being useful in close quarters. This results from the fact that the inner sleeve 15 does not project beyond the outer sleeve and the outer sleeve is of short axial length so that when the high pressure tube must be bent at a sharp curve, as shown in Fig. 3, the female member may be conveniently separated from the male member and moved back and forth along the tube and around the sharp curve, providing greater convenience in connecting or disconnecting. Moreover, after a coupling has been made in close quarters between a bent tube and another portion of tubing or of a fitting, the inner sleeve usually becomes fixed to the flared end of the tube. Now, upon disconnecting the parts, the fact that the inner diameter of the outer sleeve of the female member is considerably greater than the outer diameter of the tube, it can very easily move around a sharp curve in the tube. These features make it possible to use my pipe coupling for connecting and disconnecting tubes or pipes in close quarters where other types of couplings cannot be used.

Figure 4:
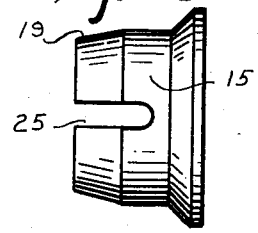
Fig. 4 is a sectional view showing a modified form of the tapered sleeve of my invention.

In Fig. 4 I have shown another embodiment of an inner sleeve 15 which is similar to that previously described except that it is provided with a plurality of slots or slits 25 which extend axially into the sleeve from the slow tapered end. With this construction greater constriction of the sleeve may be obtained when the coupling is screwed together and the pipe is clamped very firmly even though it may be substantially smaller in diameter than the diameter of the aperture through the sleeve. Moreover, the inner sleeve in this instance will spring back to normal size upon disconnecting the parts and may again be used.

It is apparent that within the scope of my invention, modifications and different arrangements may be made other than herein disclosed, and the present disclosure is illustrative merely, the invention comprehending variations thereof.

I claim:

1. A pipe coupling comprising, cooperating male and female members of generally tubular conformation having threaded engagement with each other, said male member having on its inner projecting end a conical surface providing a smooth uniform tapered seat disposed at approximately an angle of forty-five degrees to the longitudinal axis of the coupling and adapted to extend into the flared end of a tube, external threads on said male member, said female member having an inner sleeve of generally tubular conformation slidable in the outer sleeve, the outer sleeve being internally threaded at one end to engage over the externally threaded portion of the male member, said inner sleeve having a tapered seat in one end disposed at approximately the same angle as the tapered seat on said male member and adapted to engage the outer surface of the flared end of a tube to be clamped therebetween, the other end of the inner sleeve terminating within the outer sleeve and having a slow taper thereon at a point spaced considerably from the tapered end thereof, a gradually tapered constricting surface on the end of the outer sleeve surrounding the slow taper on the end of the inner sleeve so that as the outer sleeve of the female member is screwed upon the male member a double acting wedge-like lock is formed, clamping the flared end of a tube against the tapered seat on one end of the male member and at the same time clamping the slow tapered end of the inner sleeve firmly onto the tube.

2. A pipe coupling comprising, a male member having a tapered conical face on its inwardly projecting end, said tapered face being inclined at approximately forty-five degrees to the axis of said coupling, a female member consisting of an inner and an outer sleeve, the latter having threaded engagement with the male member, the inner sleeve having an inclined face in one end adapted to cooperate with the tapered face on the projecting end of the male member in clamping the flared end of a tube therebetween, the other end of the inner sleeve and the adjacent surfaces of the outer sleeve having cooperating surfaces which are slightly tapered for gradually forcing the inner sleeve toward the male member for clamping the flared end of a tube therebetween as the outer sleeve is screwed upon the male member and also simultaneously passing the inner sleeve tightly around the tube at a point so spaced from the flared end of the tube as to prevent vibrations of the tube from reaching the tapered portion thereof.

3. A pipe coupling for a flared end pipe comprising a first coupling member and a second coupling member having threaded engagement with each other, said first coupling member having on its inner projecting end a conical surface providing a tapered seat to engage the flared end of the pipe, said second coupling member comprising an outer sleeve and an inner sleeve, said outer sleeve having an internal angular abutment shoulder and an internal restricted tapered surface spaced from each other, said inner sleeve having on one end a flared tapered seat portion adapted to engage the flared end of the pipe and having on the other end a compression tapered portion, said internal angular abutment shoulder having a greater angle with respect to the longitudinal axis of the coupling than the angle of the internal restricted tapered portion and upon engaging the flared tapered seat portion clamping the flared end of the pipe between the tapered seat of the first member and the flared tapered seat portion of the second member and arresting the threading movements of the said members, said restricted tapered surface pressing the compression tapered portion radially against the pipe at a zone spaced from the flared end of the pipe.

4. A pipe coupling for a flared pipe comprising a first coupling member and a second coupling member having threaded engagement with each other, said first member having on its inner projecting end a conical surface providing a tapered seat adapted to engage the internal surface of the flared end of a pipe, said second coupling member comprising an inner and an outer sleeve, said inner sleeve being of generally tubular conformation slidable in the outer sleeve and having on one end thereof a flared tapered seat portion adapted to engage the outer surface of the flared end of the pipe and having on the end opposite from the flared tapered seat portion a compression tapered portion disposed at a relatively small angle to the longitudinal axis of the coupling, said outer sleeve having an internal angular abutment shoulder of substantially the same angle as the flared tapered seat portion for engaging the latter and thereby clamping the flared end of the pipe firmly between the said tapered seat portion and the tapered seat of the first member as the said members are screwed together, said outer sleeve also having an internal restriction tapered surface surrounding the compression tapered portion of the inner sleeve and being of substantially the same angle to firmly press the said compression tapered portion radially against the pipe at a zone spaced from the flared end of the pipe as the said coupling members are screwed together, said flared tapered seat portion having a greater angle with respect to the longitudinal axis of the coupling than the angle of the said compression tapered portion and thereby arresting the threading movement of said coupling members as they are screwed together.

5. A pipe coupling for a flared pipe comprising a first coupling member and a second coupling member having threaded engagement with each other, said first member having on its inner projecting end a conical surface providing a tapered seat adapted to engage the internal surface of the flared end of a pipe, said second coupling member comprising an inner and an outer sleeve, said inner sleeve being of generally tubular conformation slidable in the outer sleeve and having on one end thereof a flared tapered seat portion adapted to engage the outer surface of the flared end of the pipe and having on the end opposite from the flared tapered seat portion a compression tapered portion disposed at a relatively small angle to the longitudinal axis of the coupling, said outer sleeve having an internal angular abutment shoulder of substantially the same angle as the flared tapered seat portion for engaging the latter and thereby clamping the flared end of the pipe firmly between the said tapered seat portion and the tapered seat of the first member as the said members are screwed together, said outer sleeve also having an internal restriction tapered surface surrounding the compression tapered portion of the inner sleeve and being of substantially the same angle to firmly press the said compression tapered portion radially against the pipe at a zone spaced from the flared end of the pipe as the said coupling members are screwed together, said flared tapered seat portion having a greater angle with respect to the longitudinal axis of the coupling than the angle of the said compression tapered portion and thereby arresting the threading movement of said coupling members as they are screwed together, said inner sleeve having a cylindrical portion between the said flared tapered seat portion and the said compression tapered portion.

6. In a coupling for tubes having the ends thereof flared, coupling members having threaded engagement with each other, one of said coupling members having a seat associated therewith adapted to engage the inner face of the flared end of the tube and the other coupling member having a clamping shoulder, a clamping sleeve surrounding said tube and having a solid head provided with a shoulder against which the clamping shoulder of said other coupling member engages, said head having the inner surface thereof provided with a coniform flare engageable with the outer face of the flared end of the tube for clamping said flared end against said seat, said clamping shoulder on the coupling member and said shoulder on the clamping sleeve being initially separated, said sleeve being extended beyond said head and having its external surface tapered, and said other coupling member including a tapered bore engageable with said tapered sleeve extension and effective during the threading home of said other coupling member and before said shoulders engage to progressively press the sleeve extension tightly against the tube and clamp said tube against vibration at a point spaced from the clamped flared end thereof, said shoulder engagement serving to limit the amount of said progressive pressing of the sleeve extension.

7. In a coupling for tubes, coupling members having threaded engagement with each other, one of said coupling members having a seat associated therewith against which an end portion of the tube is adapted to be clamped, the other coupling member having a clamping shoulder associated therewith, a clamping sleeve surrounding said tube and having at its inner end means for engaging and moving said tube endwise into engagement with the seat, said sleeve and said last named coupling member having cooperating surfaces for contracting the outer end portion of the sleeve into engagement with the tube for dampening vibration imparted thereto when the coupling and sleeve are moved relative to each other, said sleeve having a shoulder adapted to be engaged by the shoulder associated with the last named coupling member, said shoulders being initially spaced to permit said relative movement of said cooperating surfaces and operating when brought together to limit further contraction of the sleeve and operating when in engagement to move the tube into clamping engagement with its seat.

DAVID R. HILLIS.